3,317,737
PHOTOELECTRIC DEVICE FOR MEASURING THE SPECTRAL LINE INTENSITIES OF A RADIATING PLASMA WITH BACKGROUND RADIATION CORRECTION MEANS

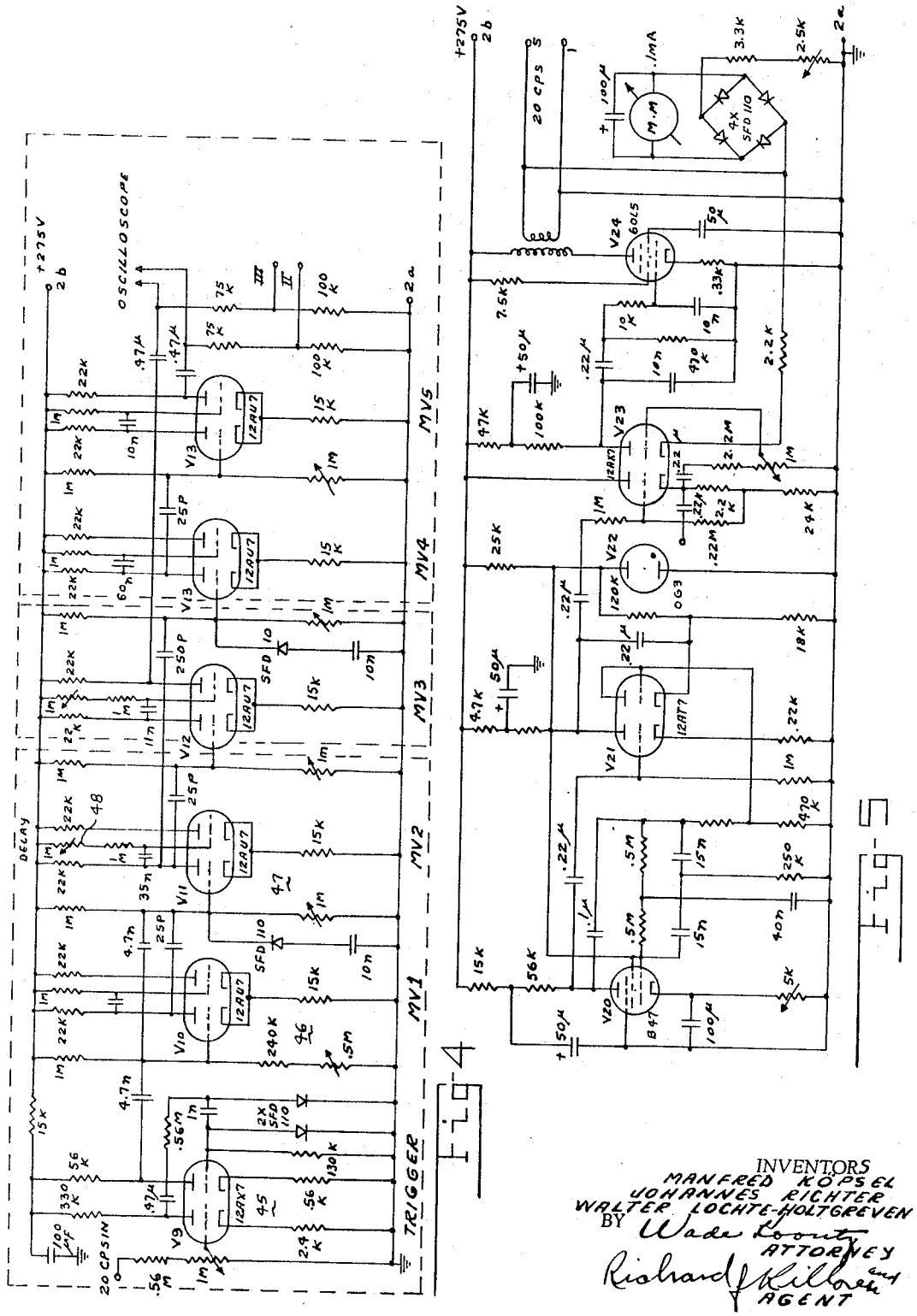

Manfred Köpsel, Neumunster, and Johannes Richter and Walter Lochte-Holtgreven, Kiel, Germany, assignors to the United States of America as represented by the Secretary of the Air Force
Filed Nov. 5, 1963, Ser. No. 321,704
2 Claims. (Cl. 250—226)

The invention relates to a device for measuring the spectral line intensities of a radiating plasma from which the temperature can be determined.

One object of the invention is to provide a device for subtracting the gackground illumination from the spectral line intensities of a radiating plasma wherein only a single photomultiplier is required.

Another object is to provide a device for subtracting the background illumination from the spectral line intensities of a radiating plasma wherein the intensity is given as an instantaneous reading on a meter.

The foregoing objects are achieved by providing a mirror arrangement with a narrow band spectrometer, wherein the mirror is used to sweep the spectral line and the background in the output of the narrow band spectrometer across a slit in front of a photomultiplier. The output of the photomultiplier is gated to apply the signal responsive to the spectral line to one terminal of a meter and to alternately apply a signal responsive to the background on both sides of the spectral line to the other terminal of the meter.

These and other objects will be more fully understood from the following detailed description taken with the drawing wherein:

FIG 3 is a circuit schematic of one possible amplifier and gate circuit for the device of FIG. 2;

FIG. 4 is a circuit schematic for a timing pulse generator and gate pulse generator circuits which may be used with the device of FIG. 2;

FIG. 5 is a circuit schematic for a 20 c.p.s. oscillator which may be used with the device of FIG. 2;

Figure 1:
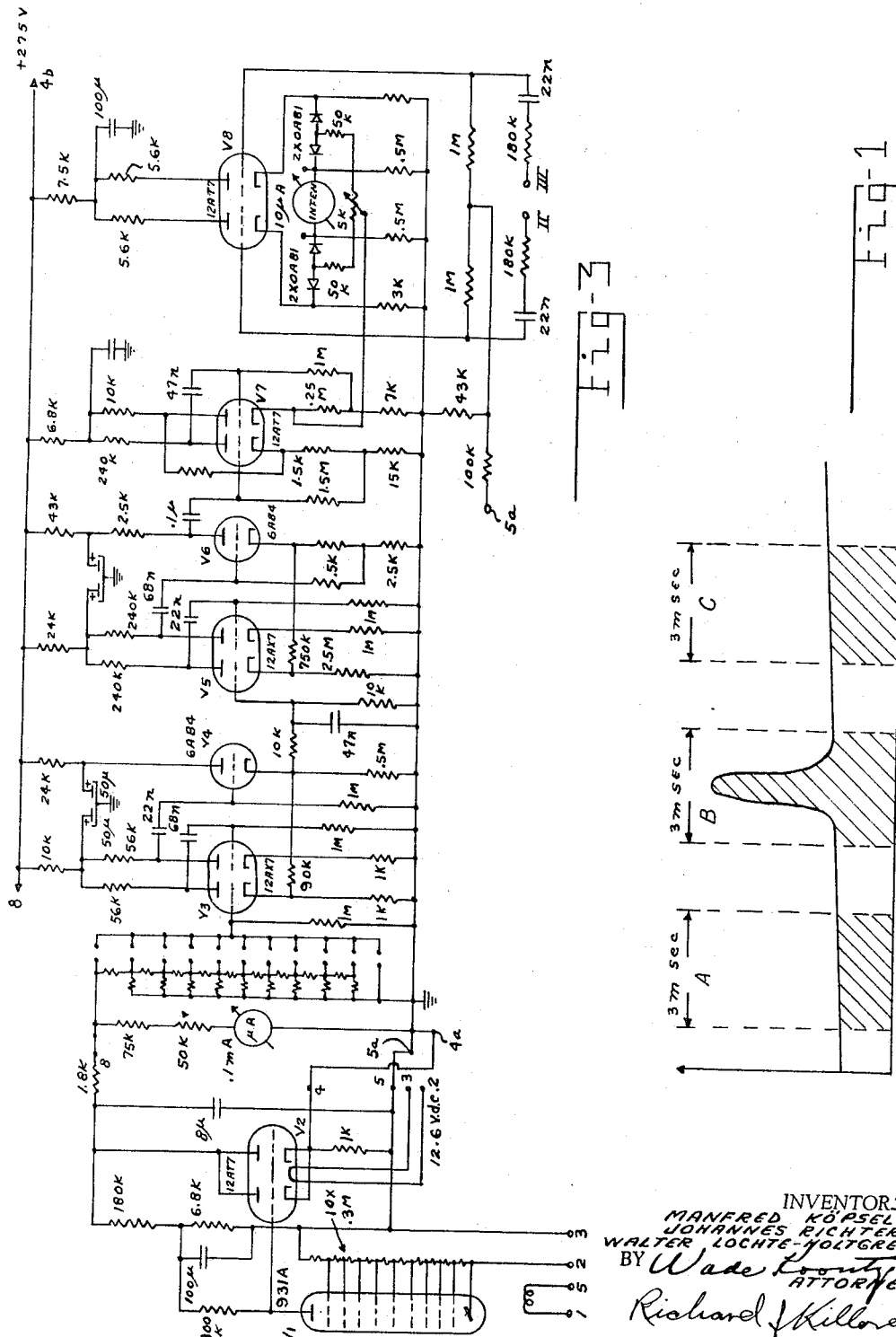
FIG. 1 shows a line profile of the spectral intensity vs. wavelength for one spectral line and the adjacent background with the slit positions at the time of switching indicated.

The temperature of a radiating plasma can be determined from the spectral line intensities. For an exact line intensity measurement, the integral over the spectral intensity of the line has to be determined. This integral is given by the shaded area under the line profile shown above the dotted line in FIG. 1 of the drawing. Thus it is seen that the area under the dotted line due to background must be subtracted from the total intensity of the line plus background to obtain the spectral line intensity.

Certain prior art systems have arrangements for doing this for two exit slits, one on the line and one on the background near the line. Such a system requires the use of two photomultipliers with their inherent different characteristics which produce errors and also will only work if the background is substantially flat.

According to this invention, a mirror arrangement is used which sweeps the spectral line and background across an output slit. A photomultiplier is located behind the slit and has its output gated so that a more accurate line intensity value is provided even in the case where the background radiation has a linear wavelength dependence, as shown in FIG. 1 by alternately subtracting the signal due to background on both sides of the spectral line.

Figure 2:
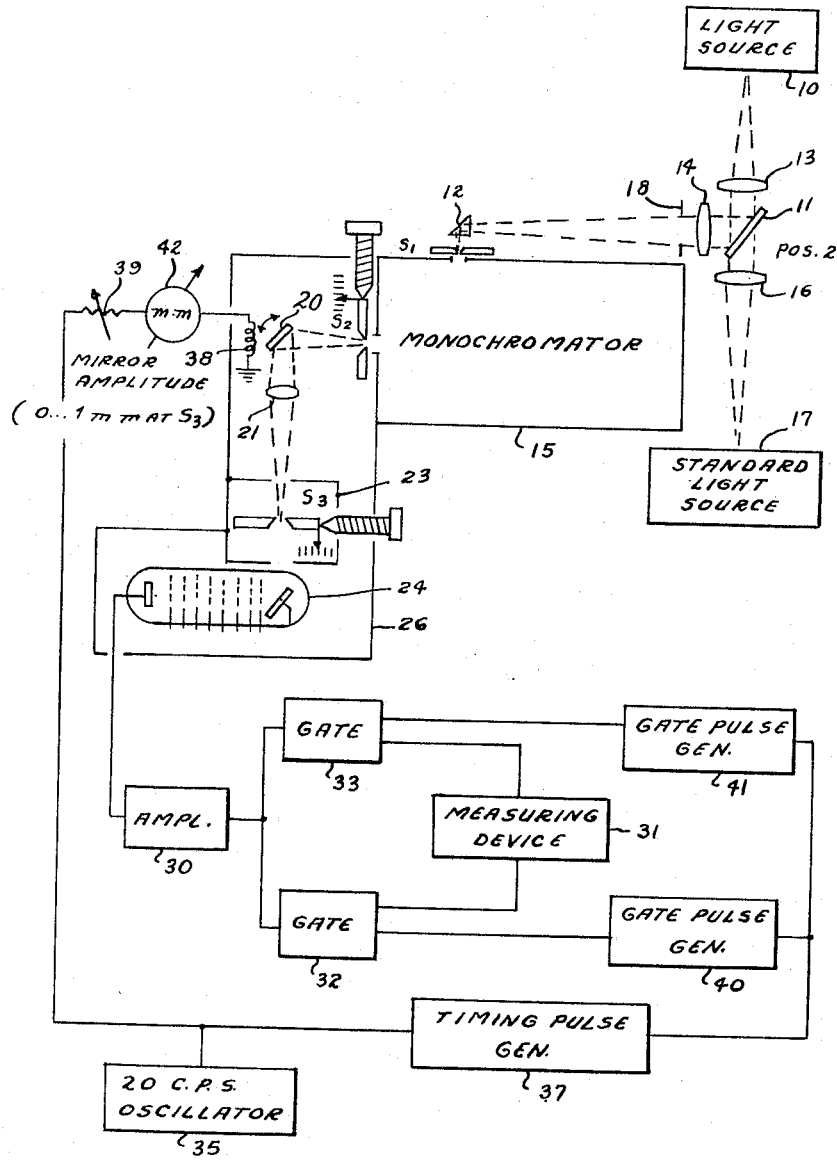
FIG. 2 is a diagrammatic showing, partially in block form, of the device of the invention.
Figure 6:
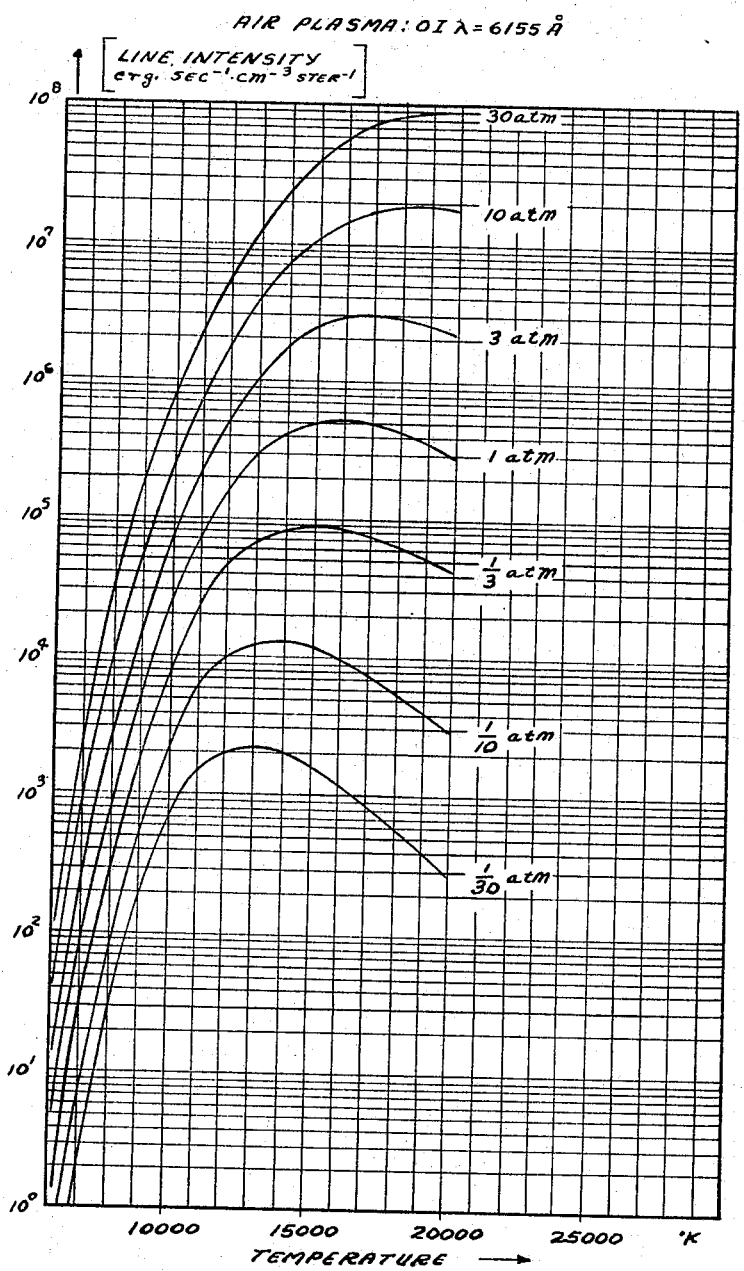
FIGS. 6–15 show intensity-temperature curves as a function of pressure in an atmospheric plasma.
Figure 7:
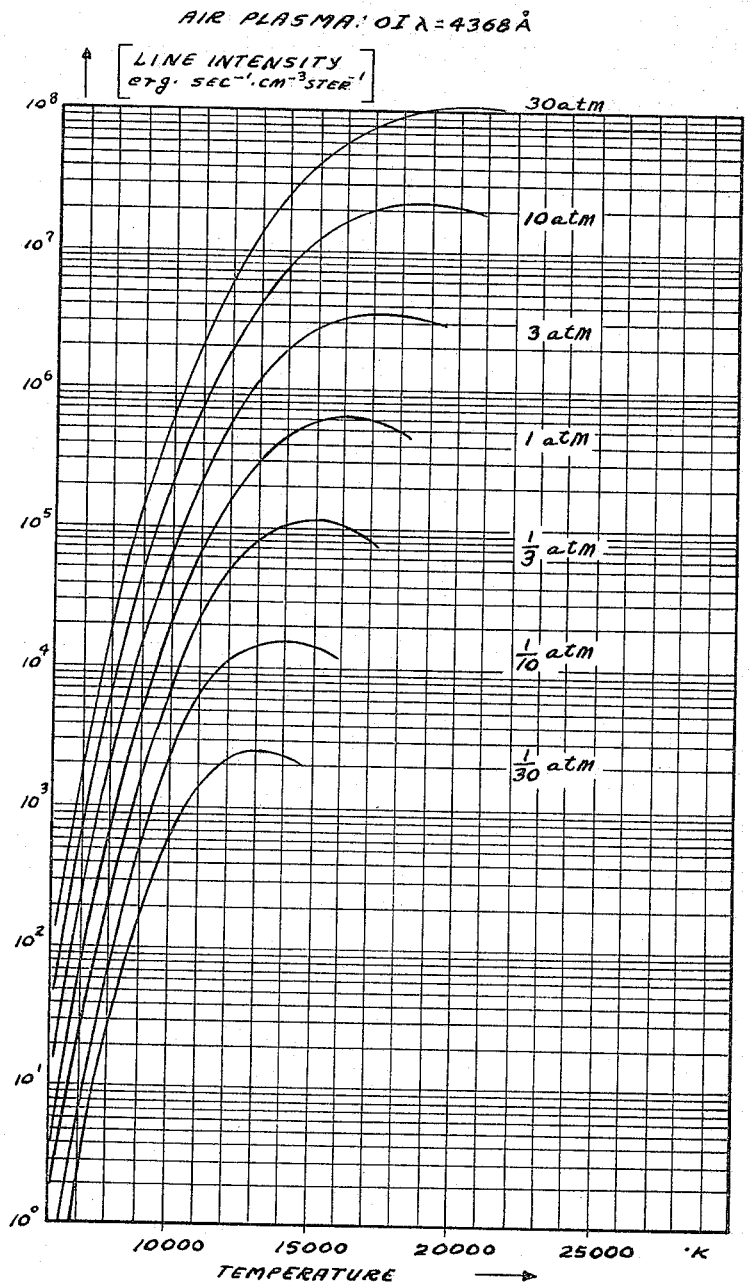
Figure 8:
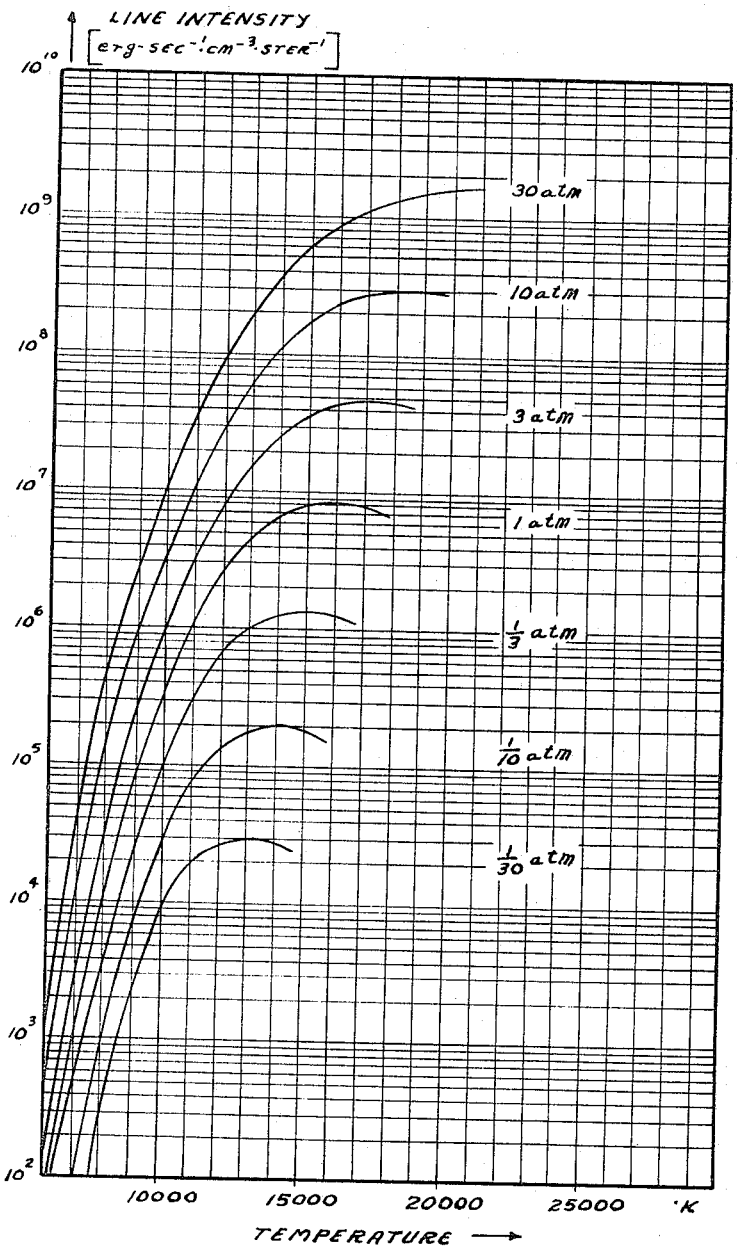
Figure 9:
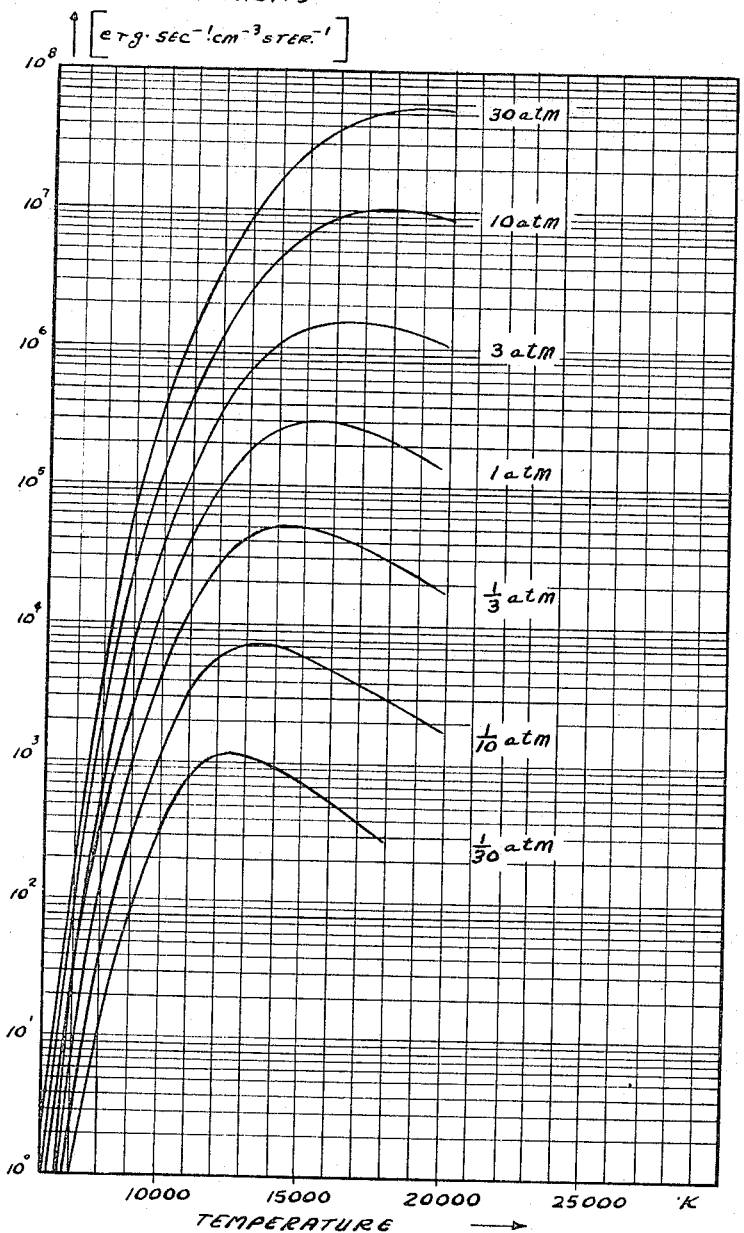
Figure 10:
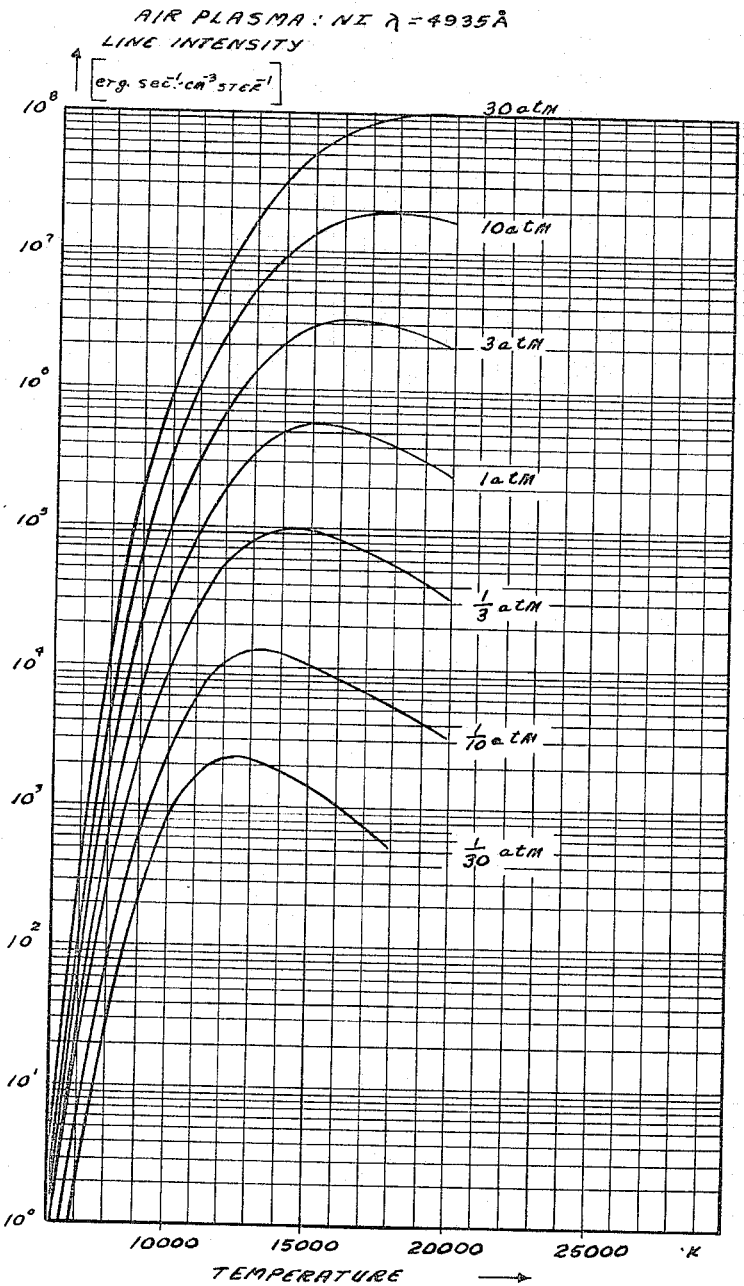
Figure 11:
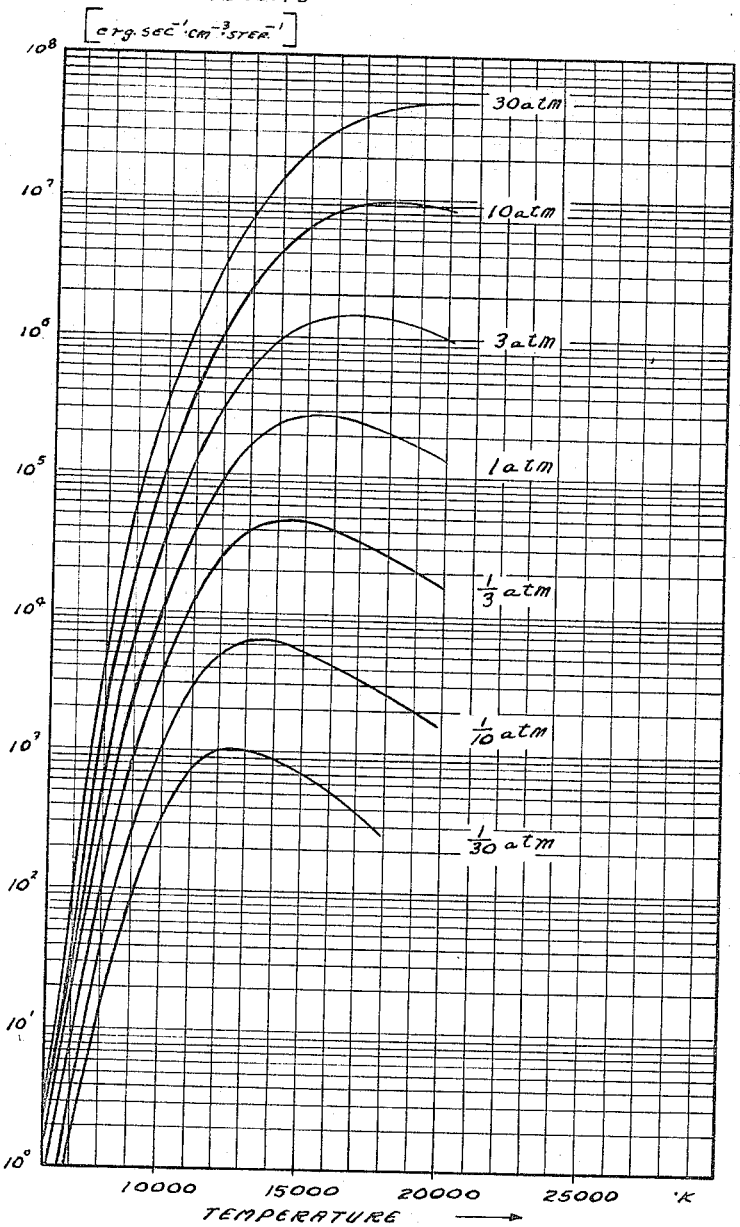
Figure 12:
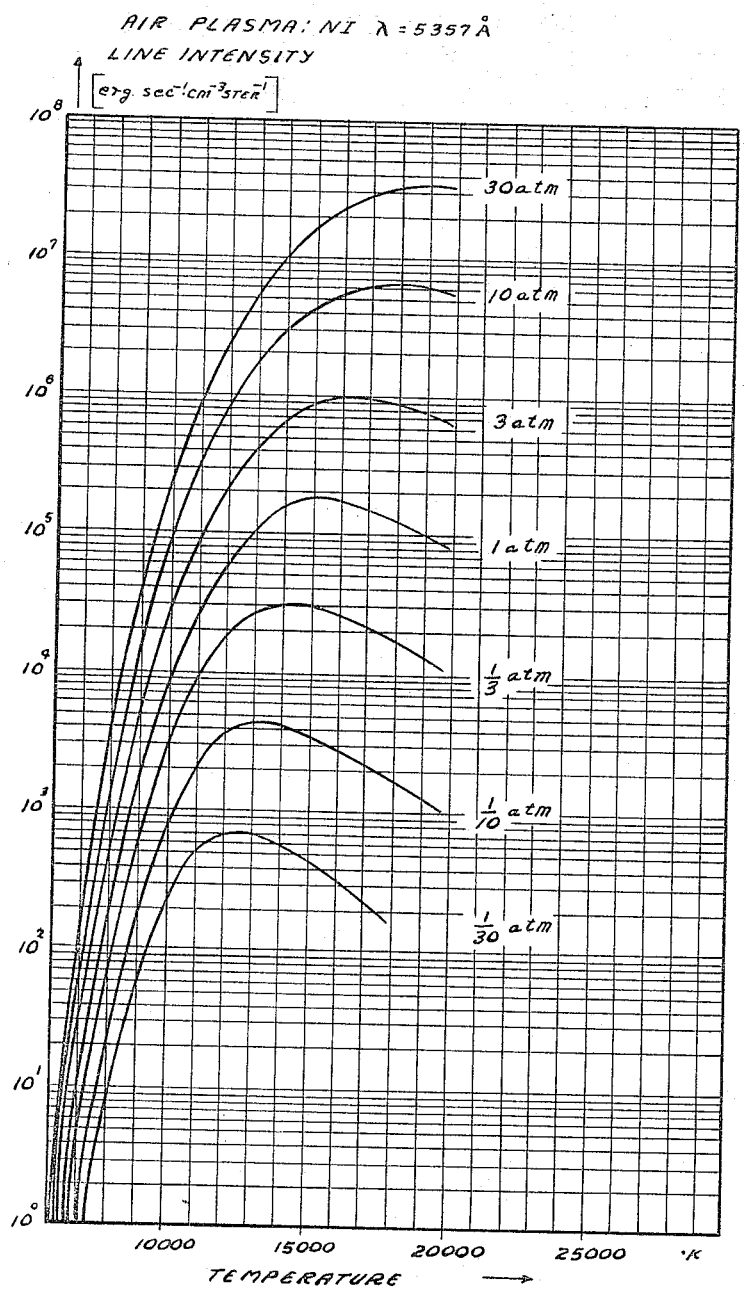
Figure 13:
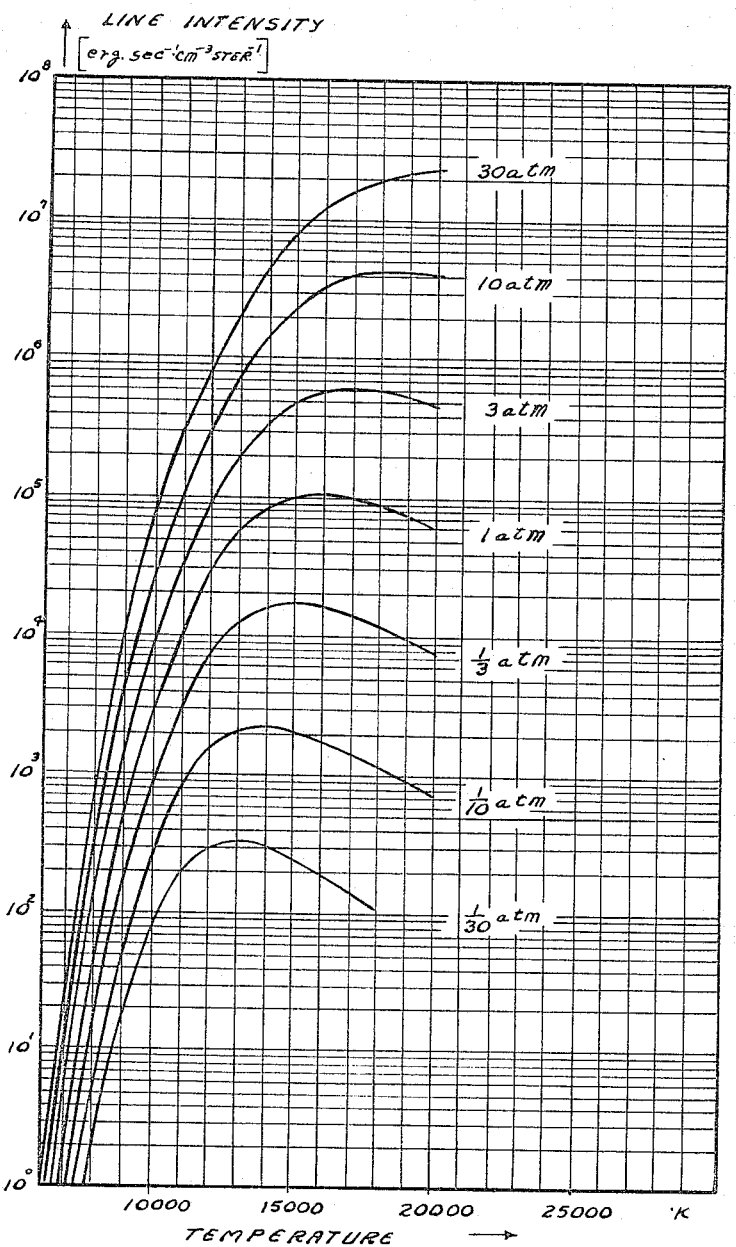
Figure 14:
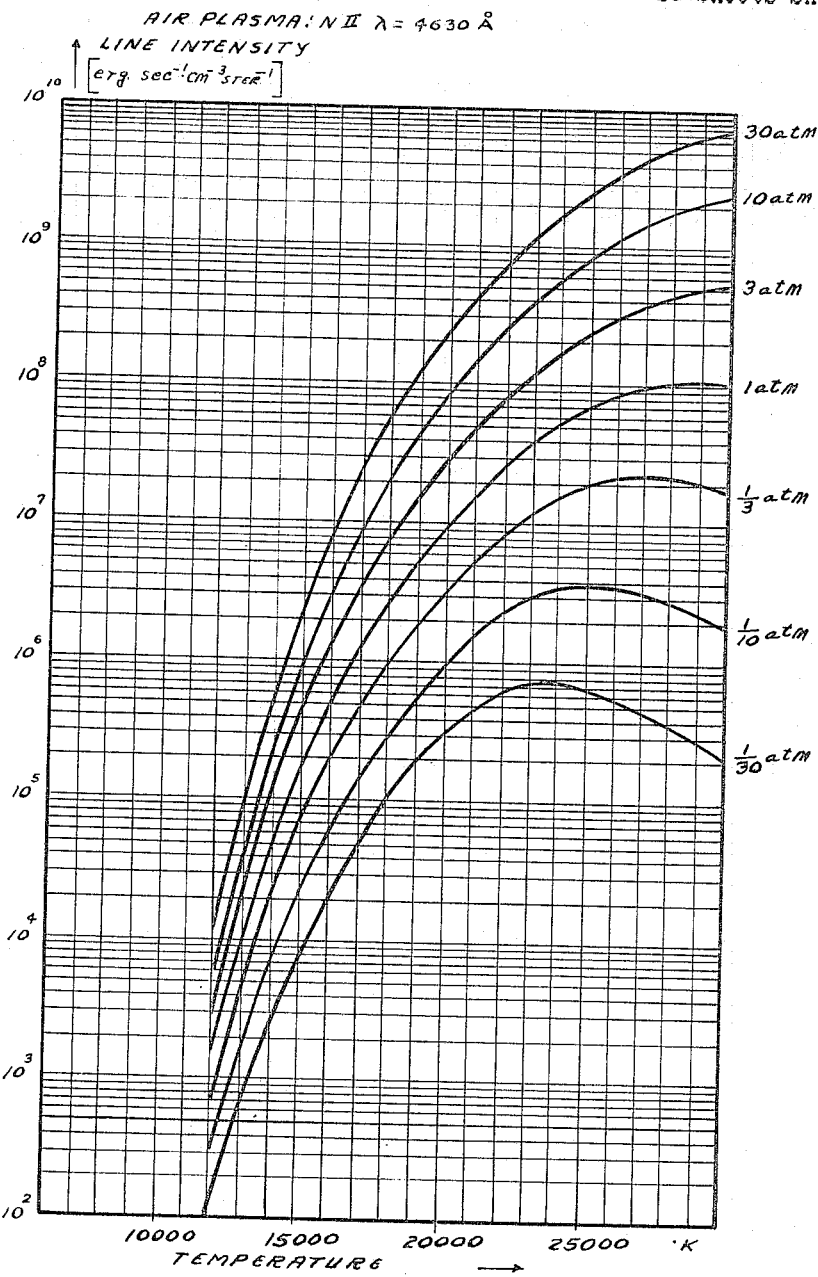
Figure 15:
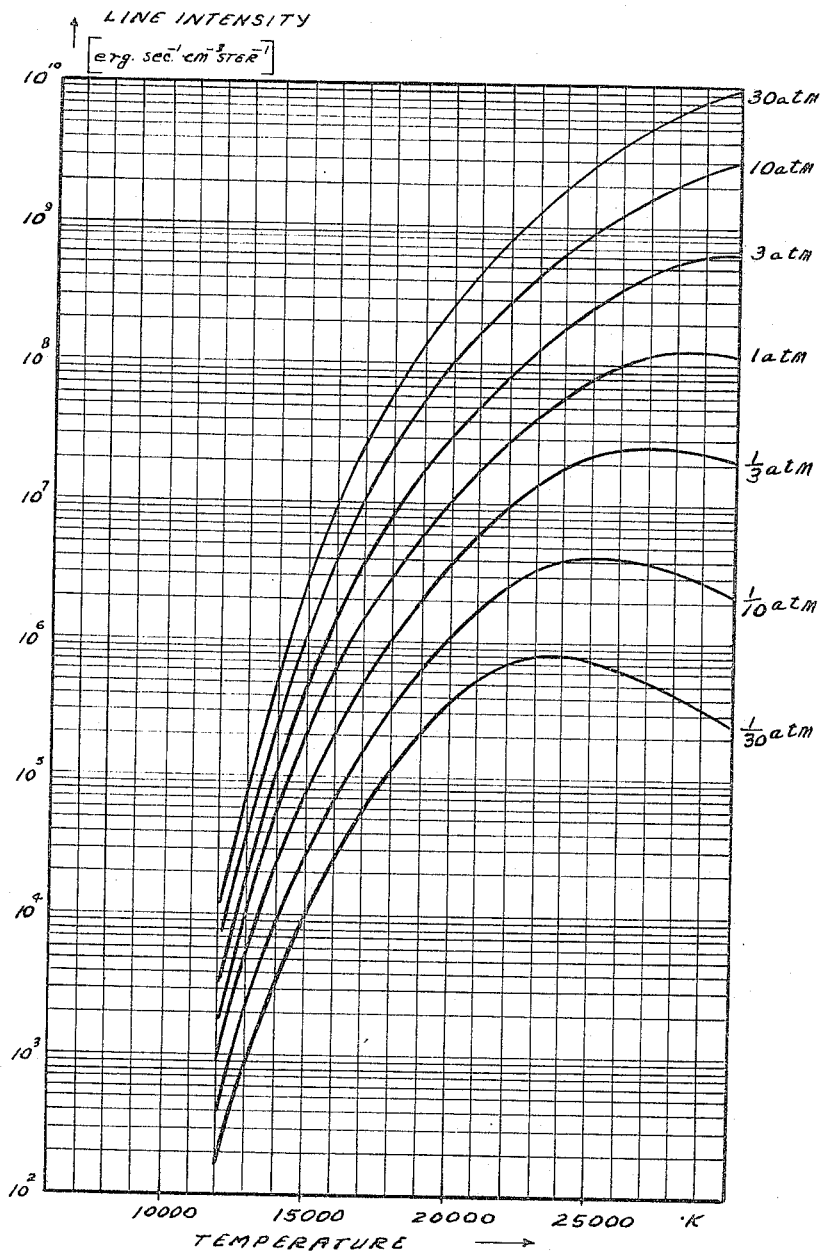

As shown in FIG. 2, light from a plasma source, generally indicated at 10, is imaged upon the entrance slit $S_1$ of a narrow band spectrometer or monochromator 15 by means of a mirror 11, a prism 12, and lenses 13 and 14. The mirror 11 can be moved to an alternate position 2 so that lenses 14 and 16 focus light from a standard source 17 at the entrance slit $S_1$. The monochromator 15 is a standard Bausch and Lomb type (33–86–45–01) grating monochromator with grating of 600 grooves/mm. Filters or diaphragms such as shown schematically at 18, may be provided when needed for reducing the light intensity or the solid angle and cutting out dispersed light and may be located between lens 14 and prism 12.

An oscillating mirror 20 is located behind the monochromator output slit $S_2$. A lens 21 forms the image of slit $S_2$ on the mask 23 having an output slit $S_3$. A photomultiplier 24 receives the light passing slit $S_3$.

The mirror 20, lens 21, mask 22, and photomultiplier 24 are housed in an opaque housing 26.

The output of the photomultiplier 24 is applied to an amplifier 30, shown in greater detail in FIG. 3, and then to a measuring instrument 31 through gate circuits 32 and 33, shown in greater detail in FIG. 3.

A 20 c.p.s. oscillator 35, shown in greater detail in FIG. 5, supplies a 20 c.p.s. signal to the timing pulse generator 37 and to the mirror drive 38. The timing pulse generator has a variable delay so that the phase of the output pulses to gate pulse generators 40 and 41 may be controlled. The gate pulse generator 40 applies a 3 msec. gate pulse to gate circuit 32 when the mirror 20 is at either of its maximum deflection positions. The gate pulse generator 41 applies a 3 msec. pulse to the gate circuit 33 when the mirror 20 passes through its center position. Thus the signal from amplifier 30 is applied to the measuring instrument 31 through gate 32 for the times indicated as A and C in FIG. 1 and through gate 33 for the time indicated as B in FIG. 1. Since the signal due to background light on both sides of the spectral line is subtracted in the measuring instrument, a more accurate intensity measurement is provided. The circuits for the timing pulse generator and gate pulse generators are shown in FIG. 4. The 20 c.p.s. signal from oscillator 35 is applied to trigger circuit 45 which applies a trigger pulse to monostable multivibrators 46 and 47 once each cycle. Thus a trigger pulse is applied to multivibrators 46 and 47 from the trigger circuit every 50 msec. The delay time of multivibrator 46 is set to equal 25 msec. so that multivibrator 47 receives a pulse either from trigger circuit 45 or multivibrator 46 every 25 msec. The delay time of multivibrator 47 may be adjusted by means of variable resistor 48 to change the delay between 0 and 20 msec. so that the gate pulses can be synchronized with the oscillating mirror. An oscilloscope may be used for synchronizing the device. It is obvious that circuits other than those shown may be used. The measuring instrument used is a standard μA. meter.

In the operation of the device of the invention the mirror 11 is located in position 2. The plasma light source is then focused at the slit $S_1$. A spectral line suitable for good temperature measurement is selected by the monochromator. The width of slit $S_1$ is set equal to $L.W./D$. where L.W. equals line width and D equals the dispersion of the monochromator which for the device used is 33 A./mm. In any case, the width of the slit should not be set less than 0.03 mm. Slit $S_2$ is opened wide. Slit $S_3$ is made equal to $3S_1$. The oscillating mirror amplitude is adjusted by 39 and multimeter 42 to about $6S_1$ at the slit plane of $S_3$.

The intensity of the plasma source $A_L$ is then read on the meter in terms of the meter scale. To obtain an absolute intensity measurement, the mirror 11 is adjusted to position 2 and slit $S_2$ is made equal to slit $S_1$. The intensity of the carbon arc $A_C$ for the line wavelength is then read on the meter. The intensity of the spectral line is then obtained from the following expression:

$$I = \frac{A_L}{A_C} \cdot E_\lambda \cdot D \cdot S_2$$

where

I=total line intensity
$E_\lambda$=spectral line intensity of carbon arc
D=dispersion of monochromator 33 A./mm.
$S_2$=width of slit $S_2$ (mm.)

wherein $E_\lambda$ is obtained by using the table which follows:

| Wavelength, A. | Intensity, erg/sec.cm.$^3$ ster. | Wavelength, A. | Intensity, erg/sec.cm.$^3$ ster. |
|---|---|---|---|
| 3800 | $0.845 \cdot 10^{13}$ | NI 5357 | $2.45 \cdot 10^{13}$ |
| 3900 | $0.942 \cdot 10^{13}$ | 5400 | $2.48 \cdot 10^{13}$ |
| OI 3947 | $0.990 \cdot 10^{13}$ | NI 5412 | $2.49 \cdot 10^{13}$ |
| 4000 | $1.05 \cdot 10^{13}$ | 5500 | $2.56 \cdot 10^{13}$ |
| 4100 | $1.16 \cdot 10^{13}$ | 5600 | $2.63 \cdot 10^{13}$ |
| 4200 | $1.27 \cdot 10^{13}$ | NII 5680 | $2.68 \cdot 10^{13}$ |
| 4300 | $1.38 \cdot 10^{13}$ | 5700 | $2.70 \cdot 10^{13}$ |
| OI 4368 | $1.46 \cdot 10^{13}$ | 5800 | $2.76 \cdot 10^{13}$ |
| 4400 | $1.49 \cdot 10^{13}$ | 5900 | $2.82 \cdot 10^{13}$ |
| 4500 | $1.60 \cdot 10^{13}$ | 6000 | $2.87 \cdot 10^{13}$ |
| 4600 | $1.71 \cdot 10^{13}$ | 6100 | $2.92 \cdot 10^{13}$ |
| NII 4631 | $1.75 \cdot 10^{13}$ | OI 6157 | $2.95 \cdot 10^{13}$ |
| 4700 | $1.82 \cdot 10^{13}$ | 6200 | $2.97 \cdot 10^{13}$ |
| 4800 | $1.93 \cdot 10^{13}$ | 6300 | $3.01 \cdot 10^{13}$ |
| 4900 | $2.03 \cdot 10^{13}$ | 6400 | $3.05 \cdot 10^{13}$ |
| NI 4915 | $2.04 \cdot 10^{13}$ | 6500 | $3.08 \cdot 10^{13}$ |
| NI 4935 | $2.06 \cdot 10^{13}$ | 6600 | $3.10 \cdot 10^{13}$ |
| 5000 | $2.13 \cdot 10^{13}$ | 6700 | $3.12 \cdot 10^{13}$ |
| 5100 | $2.23 \cdot 10^{13}$ | 6800 | $3.14 \cdot 10^{13}$ |
| 5200 | $2.31 \cdot 10^{13}$ | 6900 | $3.15 \cdot 10^{13}$ |
| NI 5281 | $2.38 \cdot 10^{13}$ | 7000 | $3.16 \cdot 10^{13}$ |
| 5300 | $2.39 \cdot 10^{13}$ | 7100 | $3.17 \cdot 10^{13}$ |

The intensity per cm. of length of the flowing plasma $$\frac{I}{L} = \frac{A_L}{A_C} \cdot \frac{E_\lambda}{L} \cdot D \cdot S_2$$

From this value the temperature for an air plasma can be determined from the charts shown in FIGS. 6–15.

The temperature for other plasmas may be determined from the value $I/L$ in the manner known in the prior art.

There is thus provided a device for providing a more accurate spectral line intensity measurement.

While a specific embodiment of the invention has been described in detail, it is obvious that numerous changes may be made without departing from the general principle and scope of the invention.

We claim:
1. A device for measuring the spectral line intensities of light from a radiating plasma; comprising, a narrow band spectrometer having an input slit and an output slit; means for focusing the radiating plasma on the input slit of said narrow band spectrometer; a light-tight housing adjacent the output slit of said narrow band spectrometer; a photomultiplier within said housing; means, including an oscillating mirror, within said housing, for impressing the light from said output slit on said photomultiplier; means for driving said oscillating mirror at a predetermined frequency; a mask, having a slit therein, located between said oscillating mirror and said photomultiplier; a measuring instrument having at least two input terminals; a first circuit means, including a gate circuit, for connecting the output of said photomultiplier to one terminal of said measuring instrument; a second circuit means, including a gate circuit, for connecting the output of said photomultiplier to the other terminal of said measuring instrument; means responsive to the means for driving said mirror at a predetermined frequency, for closing the gate in said first circuit for a predetermined time interval when said mirror is in either of its maximum deflection positions; means, responsive to the means for driving said mirror at a predetermined frequency, for closing the gate in said second circuit for a time equal to said predetermined time interval when said mirror is in its equilibrium position; and means for providing a reference intensity indication on said measuring instrument.

2. A device for measuring the spectral line intensities of a radiating plasma; comprising, a narrow band spectrometer having an input slit and an output slit; means for focusing the radiating plasma on the input slit of said narrow band spectrometer; a light-tight housing adjacent the output slit of said narrow band spectrometer; a photomultiplier within said housing; means including a mirror within said housing, for impressing the light from said output slit on said photomultiplier; means for deflecting said mirror through a predetermined angle at a predetermined frequency; a mask, having a slit therein, located between said mirror and said photomultiplier; a measuring instrument having at least two input terminals; a first circuit means including a gate circuit for connecting the output of said photomultiplier to one terminal of said measuring instrument; a second circuit means, including a gate circuit, for connecting the output of said photomultiplier to the other terminal of said measuring instrument; means responsive to the means for deflecting said mirror at a predetermined frequency, for producing a first gate pulse covering a predetermined time interval corresponding to the time when said mirror is in either of its maximum deflection positions; means for applying said first gate pulse to the gate circuit in said first circuit, to thereby apply the output signal of said photomultiplier responsive to the background intensity of the light to said measuring instrument; means, responsive to the means for deflecting said mirror at a predetermined frequency, for producing a second gate pulse covering a time equal to said predetermined time interval corresponding to the time when said mirror is in its equilibrium position; means for applying said second gate pulse to the gate circuit in said second circuit, to thereby apply the output signal of said photomultiplier, responsive to the intensity of the spectral line, to said measuring instrument; and means for providing a reference intensity indication on said measuring instrument.

References Cited by the Examiner

UNITED STATES PATENTS

| 2,406,318 | 8/1946 | Brace | 250—226 X |
| 2,630,736 | 3/1953 | Beitz | 250—235 X |
| 3,004,465 | 10/1961 | White | 88—14 |

RALH G. NILSON, *Primary Examiner.*

J. D. WALL, *Assistant Examiner.*